(12) United States Patent
Hammerum et al.

(10) Patent No.: US 11,939,959 B2
(45) Date of Patent: Mar. 26, 2024

(54) STOPPING A WIND TURBINE ROTOR BASED ON STORED PITCH ANGLE SIGNAL

(71) Applicant: VESTAS WIND SYSTEMS A/S, Aarhus N. (DK)

(72) Inventors: Keld Hammerum, Hadsten (DK); Christian Jeppesen, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 106 days.

(21) Appl. No.: 17/779,112

(22) PCT Filed: Nov. 20, 2020

(86) PCT No.: PCT/DK2020/050314
§ 371 (c)(1),
(2) Date: May 23, 2022

(87) PCT Pub. No.: WO2021/098925
PCT Pub. Date: May 27, 2021

(65) Prior Publication Data
US 2022/0403821 A1 Dec. 22, 2022

(30) Foreign Application Priority Data
Nov. 21, 2019 (DK) .......................... PA 2019 70709

(51) Int. Cl.
*F03D 7/02* (2006.01)
(52) U.S. Cl.
CPC ......... *F03D 7/0224* (2013.01); *F03D 7/0264* (2013.01)

(58) Field of Classification Search
CPC ........................... F03D 7/0224; F03D 7/0264
See application file for complete search history.

(56) References Cited

U.S. PATENT DOCUMENTS

| 2011/0040413 A1 | 2/2011 | Jeppesen et al. | |
| 2016/0258416 A1* | 9/2016 | Hammerum | ............ F03D 7/024 |
| 2022/0403821 A1* | 12/2022 | Hammerum | .......... F03D 7/0224 |

(Continued)

FOREIGN PATENT DOCUMENTS

| CN | 108443065 A | 8/2018 |
| CN | 110296046 A | 10/2019 |
| EP | 2535574 A1 | 12/2012 |

(Continued)

OTHER PUBLICATIONS

Danish Patent and Trademark Office, 1st Technical Examination including The Search Report and Search Opinion for Application PA 2019 70709 dated May 26, 2020.

(Continued)

*Primary Examiner* — Christopher R Legendre
(74) *Attorney, Agent, or Firm* — Patterson + Sheridan, LLP

(57) ABSTRACT

The present invention relates to control of a wind turbine in a stop process in response to a rotor stop signal. The rotor stop process comprises the steps of prior to receipt of the rotor stop signal, generating a stored pitch angle signal by storing pitch angle signals for at least a fraction of a rotor revolution, and determining at least one periodic component of the stored signal. The rotor blades of the wind turbine are controlled towards a feathering position using a pitch control signal containing the at least one periodic component.

18 Claims, 3 Drawing Sheets

(56) References Cited

U.S. PATENT DOCUMENTS

2022/0403822 A1* 12/2022 Hammerum ............ F03D 7/024

FOREIGN PATENT DOCUMENTS

| KR | 20130074261 | A  | 7/2013  |
|----|-------------|----|---------|
| KR | 101466104   | B1 | 11/2014 |
| KR | 101475274   | B1 | 12/2014 |
| WO | 2015003710  | A1 | 1/2015  |
| WO | 2021098925  | A1 | 5/2021  |

OTHER PUBLICATIONS

PCT, International Search Report for Application PCT/DK2020/050314 dated Sep. 2, 2021.
PCT, Written Opinion of The International Searching Authority for Application PCT/DK2020/050314 dated Sep. 2, 2021.

* cited by examiner

STOPPING A WIND TURBINE ROTOR BASED ON STORED PITCH ANGLE SIGNAL

FIELD OF THE INVENTION

The present invention relates to control of a wind turbine, and in particular it relates to controlling a wind turbine to stop the rotor in response to a rotor stop signal, based on a stored pitch angle signal.

BACKGROUND OF THE INVENTION

In pitch-controlled wind turbines, the pitch of the wind turbine blades is adjusted in response to the wind conditions, and in order to obtain a desired energy production. As the wind turbine rotor rotates during operation, the loads on each wind turbine blade changes, e.g. due to wind shear, tower passage, turbulence, etc. This may cause asymmetric load distribution among the wind turbine blades. This is undesirable, since it leads to high loads on the rotor, the drive train, etc. In order to avoid this an individual pitch control strategy is sometimes used. According to an individual pitch control strategy, the pitch angles of the individual blades are adjusted in order to take conditions at the azimuthal position of each blade into account.

When a stop command or shutdown command is generated for a pitch-controlled wind turbine and a safety operation is initiated, e.g. due to an emergency situation, the wind turbine blades are normally moved towards a feathered position. However, fir wind turbines in which the wind turbine blades are pitched individually, the pitch angles of the wind turbine blades are not identical when the stop command or shutdown command is received. On the contrary, the pitch angle of each wind turbine blade has been adjusted in such a manner that it takes the conditions prevailing at the exact position of the blade in question into account. In such a situation, if all the wind turbine blades are simply moved as quickly as possible towards the feathered position when the stop command or shutdown command is received, the mutual differences in the pitch angles will remain as the wind turbine blades continue rotation in the rotor plane, while moving towards the feathered position. As a result, the positive effect of the azimuth dependent pitching is lost. Moreover, the turbine safety system performing the shutdown may operate with reduced sensing and actuation capabilities, further complicating the application of individual pitching during the stopping process.

In EP2290232 A1 (MHI) a solution to this issue is disclosed, in that when a wind turbine halt command is received, the pitch angles of the wind turbine blades are First matched, and once matched the blades are moved towards the feathering position.

Also WO14173417 A1 (Vestas) disclosed a solution for ensuring pitch alignment as a first step in the feathering of the blades. In this disclosure a timing of the alignment is dealt with.

WO2015/003710 A1 (Vestas) discloses a solution where the individual pitching is maintained to a certain degree after the shutdown command has been received. Here a safety control system takes over the pitching of the blades and by utilizing constant pitch rates, individual pitching is maintained in a manner which emulates individual pitching utilizing constant pitch rates and thereby obtain the asymmetric load mitigation to a certain extent also during the feathering process.

Also WO2006/007838 A1 (Vestas) discloses a solution where the individual pitching is continued during the feathering process.

It is against this background that the invention has been devised.

SUMMARY OF THE INVENTION

It is an object of embodiments of the invention to improve handling of asymmetric loads acting on components of the wind turbine during a shutdown process.

Accordingly, in a first aspect, there is provided a method for controlling a wind turbine in response to a rotor stop signal, the wind turbine comprises a rotor with at one or more pitch adjustable rotor blades; wherein the method comprises the steps:

- prior to receipt of the rotor stop signal, generate a stored pitch angle signal by storing pitch angle signals for each of the pitch adjustable rotor blades for at least a fraction of a rotor revolution;
- either prior to receipt of the rotor stop signal, or upon receipt of the rotor stop signal, determine at least one periodic component of the stored signal;
- upon receipt of the rotor stop signal, control the pitch adjustable rotor blades towards a feathering position using a pitch control signal containing the at least one periodic component.

In this manner, the individual pitching that was activated prior to receiving the rotor stop signal is maintained, at least to a certain degree, during the stopping process where the pitch adjustable rotor blades are moved towards a feathering position. While prior art has provided solution which also mitigate asymmetric loads on the rotor or the tower during a stopping process, the present invention is advantageous in that it synthesizes the load mitigating pitch activity used prior to stopping the rotor, and applies this synthesized load mitigating pitch activity during the stopping process. The synthetization of the load mitigating pitch activity used prior to stopping the rotor is obtained by determine at least one periodic component of the stored signal. The application of the synthesized load mitigating pitch activity is done by including a pitch control signal containing the at least one periodic component in the applied pitch signal of the pitch adjustable rotor blades. In this manner, an approximation of the optimal trajectory can be obtained without adding the complexity of having e.g. blade load sensors as part of the stopping (safety) system.

In further aspects, the invention relates to a wind turbine comprising a control system arranged to perform the method according to the first aspect and to a computer program product comprising software code adapted to control a wind turbine when executed on a data processing system, the computer program product being adapted to perform the method of the first aspect.

The computer program product may be provided on a computer readable storage medium or being downloadable from a communication network. The computer program product comprises instructions to cause a data processing system, e.g. in the form of a controller, to carry out the instruction when loaded onto the data processing system.

In general, a controller may be a unit or collection of functional units which comprises one or more processors, input/output interface(s) and a memory capable of storing instructions can be executed by a processor.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
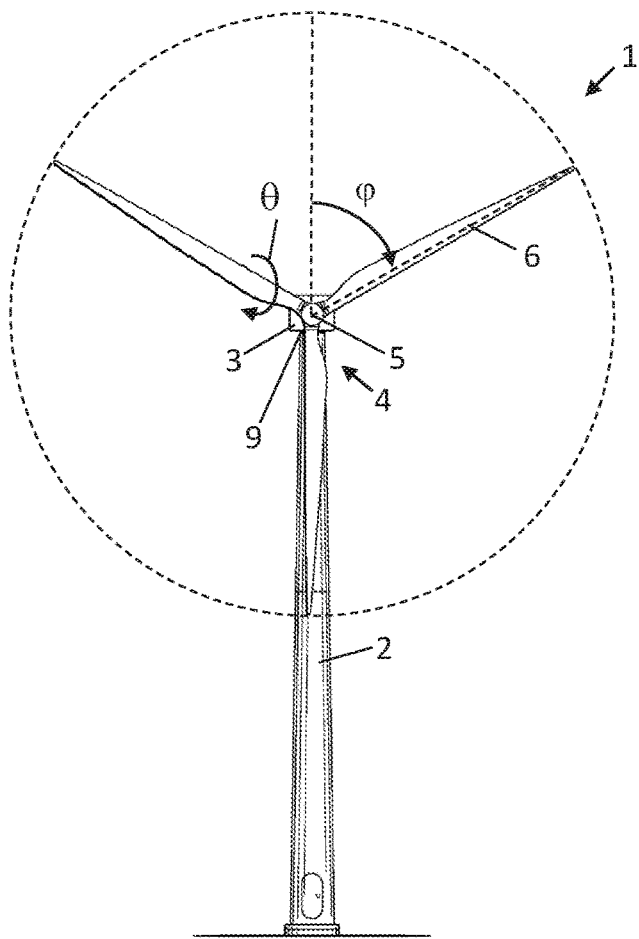
FIG. 1 illustrates, in a schematic view, an example of a wind turbine.

FIG. 1 illustrates, in a schematic view, an example of a wind turbine 1. The wind turbine 1 includes a tower 2, a nacelle 3 placed at the apex of the tower, and a rotor 4 operatively coupled to a generator housed inside the nacelle 3. In addition to the generator, the nacelle houses miscellaneous components required for converting wind energy into electrical energy and various components needed to operate, control, and optimize the performance of the wind turbine 1. The rotor 4 of the wind turbine includes a central hub 5 and a plurality of blades 6 that project outwardly from the central hub 5. In the illustrated embodiment, the rotor 4 includes three blades 6, but the number may vary. Moreover, the wind turbine comprises a control system. The control system may be placed inside the nacelle or distributed at a number of locations inside (or externally to) the turbine and communicatively connected. The rotor blades are pitch-adjustable, here indicated with the pitch angle θ. The rotor blades can be adjusted in accordance with a collective pitch setting, where each of the blades are set to the same pitch value. In addition to that, the rotor blades are adjustable in accordance with individual pitch settings, where each blade may be provided with an individual pitch setpoint. The rotor blades moves in a rotor plane, here the angular position of each blade in the rotor plane denoted using the azimuth angle φ.

The rotor blades 6 are mechanically connected to an electrical generator, possibly, via gearbox. In direct drive systems, and other systems, the gear box may not be present. The electrical power generated by the generator is injected into a power grid via an electrical converter. The electrical generator and the converter may be based on a full-scale converter (FSC) architecture or a doubly fed induction generator (DFIG) architecture, but other types may be used.

The control system comprises a number of elements, including at least one main controller with a processor and a memory, so that the processor is capable of executing computing tasks based on instructions stored in the memory. In general, the wind turbine controller ensures that in operation the wind turbine generates a requested power output level. This is obtained by adjusting the pitch angle and/or the power extraction of the converter. To this end, the control system comprises a pitch system including a pitch controller using a pitch reference, and a power system including a power controller using a power reference. The power controller controls the various electric components of the generator converter system in order to deliver the requested power, hereunder controls the torque of the generator that is needed to extract the requested power by the rotor from the wind. The wind turbine rotor comprises rotor blades that can be pitched by a pitch mechanism. The control system, or elements of the control system, may be placed in a power plant controller (not shown) so that the turbine may be operated based on externally provided instructions.

Figure 2:
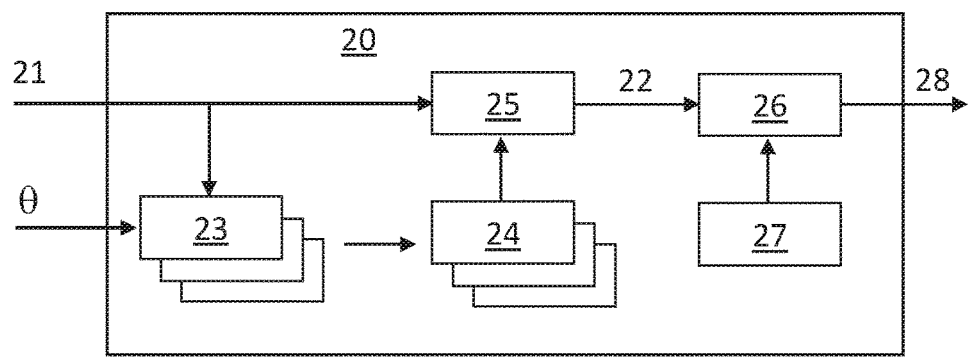
FIG. 2 schematically illustrates a controller unit implemented to control a wind turbine in response to a rotor stop signal.

FIG. 2 schematically illustrates a controller unit 20. Embodiment of the invention relates to controlling a wind turbine in response to a rotor stop signal. The controller unit being implemented with a signal input 21 arranged to receive such rotor stop signal. The stopping processing being obtain by controlling the pitch adjustable rotor blades towards a feathering position based on a pitch signal 28 to be sent to the actuator of the pitch adjustable rotor blades. The pitch signal 28 uses a pitch control signal 22 obtained using embodiments of the present invention. It is noted that the term stopping the rotor should be construed broadly to encompass both reducing the rotor speed to a lower speed, including a lower controlled speed and an idling speed, as well as reducing the rotor speed to a complete halt. The rotor stop signal may be a shutdown signal. The rotor speed is reduced (stopped) by adjusting the rotor blades, i.e the pitch angle θ of the rotor blades toward a feathering position. Here it is noted that with reference to the feathered position of a wind turbine blade means a selected pre-set angle in the range of 85° to 120° in dependence on the mechanical design of the pitch system. The specific feathered position of a wind turbine is a design choice.

Prior to receipt of the rotor stop signal, that is while operating the turbine in the period before receiving the rotor stop signal, a stored pitch angle signal 23 is generated by storing pitch angle signals for each of the pitch adjustable rotor blades for at least a fraction of a rotor revolution.

Either prior to receipt of the rotor stop signal, or upon receipt of the rotor stop signal, at least one periodic component 24 of the stored signal is determined. The computing unit may during normal operation keep determining the periodic component(s), or the determination may be done upon receipt of the rotor stop signal 21.

Then, upon receipt of the rotor stop signal 21, a pitch control signal 25 for each of the rotor blades containing the at least one periodic component is determined and used in the movement of the pitch angle towards a feathering position to reduce the rotor speed.

In general, a signal component is understood to be periodic with period T, if the following is fulfilled:

$$x(A)=x(A+nT), n \text{ being an integer i.e. } n\in[0,1,2,\ldots].$$

A constant signal x(A)=k is understood to be periodic, as it is independent of the parameter A and thus x(A)=x(A+nT)=k for all n.

In embodiments, the at least one periodic component is determined based on a Fourier transform or equivalent frequency estimating algorithm. By a Fourier transform is also understood discrete Fourier transform and implementations of the discrete Fourier transform including the Goertzel algorithm for evaluating the individual terms of the discrete Fourier transform. The expression based on a Fourier transform, also includes application of an inverse transform.

Advantageously the stored pitch signal is the pitch angle signal as a function of rotor azimuth angle, being the angle φ of the blade in the rotor plane (cf. FIG. 1). In particular, it may be advantageous to store the pitch signal as the pitch angle signal for equally spaced azimuth angles, since this allows for using the discrete Fourier transformation. When using the azimuth angle as the sampling variable, the frequency-domain filtering using the discrete Fourier transform (or equivalent) is done with azimuth angle replacing time. This is advantageous since the signal synthesis becomes agnostic to the rotor speed, while still synthesizing n-P-components correctly.

The pitch signal can be stored in any suitable manner, including as stored pitch angle references or stored pitch angular positions.

It may be advantageous not to apply too many revolutions when determining the periodic component. In this way a smearing out of the signal may be avoided and only the periodic content in the period immediately prior to the rotor stop signal is obtained.

In an embodiment, the pitch signal is stored in a manner such that the fraction of the rotor revolution is between 0.5 and 1.5 revolution. However, it may be advantageous to utilize at least one revolution to obtain the 1P signal component. In an embodiment, the fraction of a rotor revolution is substantially one rotor revolution.

The storing of the pitch angle signals for each of the pitch adjustable rotor blades to generate a stored pitch angle signal may be a continuous storing of pitch angle signals for at least the last fraction of a rotor revolution, e.g. by application of a cyclic buffer. Continuous storing may be continuous in the sense that a (substantially) complete series of the samples are stored for the fraction of the rotor revolution in question.

An example embodiment is explained in the following. This example embodiment is based on a stored pitch signal as a function of rotor azimuth angle. While as mentioned above, it is advantageous to base the stored pitch signal on the rotor azimuth angle, it may also be based on an alternative variable, e.g. be based on time.

A pitch position is synthesized from the rotor azimuth angle φ based on a predetermined sequence of N equally spaced azimuth angles:

$$\varphi_n = \frac{2\pi n}{N}, n = 0 \ldots N-1$$

Also, the pitch angle is defined as a function of the azimuth angle as:

$$\theta_n = \theta(\varphi_n)$$

that is the stored pitch angle signal is expressed as a series of N samples of the pitch angle in the given rotor azimuth position.

The at least one periodic component of the stored signal becomes periodic in the azimuth angle. In this embodiment, the periodic components found using the discrete Fourier transform of the pitch angle sequence:

$$\Theta_k = \sum_{n=0}^{N-1} \theta_n e^{-\frac{j2\pi kn}{N}}$$

An n-P component of the pitch angle is thereby described by the elements $\Theta_{\pm n \pm pN}$.

The pitch angle, i.e. the pitch control signal, can be synthesized from the frequency components $\Theta_k$ by applying the inverse transformation and finding the pitch angle for a given azimuth angle $\varphi_n$ as: $\theta(\varphi_n) = \theta_n$.

Mathematically, the pitch angle of the pitch control signal is expressed as:

$$\theta_n = \frac{1}{N} \sum_{k=0}^{N-1} \Theta_k e^{\frac{j2\pi kn}{N}}$$

In general, the pitch angle of the pitch control signal can be determined based on a selected number of periodic components, such as determined fir a finite number of selected periodic components. These components may be selected based on a knowledge of which components that are generally most prominent in the pitch angle signal. In one embodiment, the selected number includes at least the zeroth order and first order periodic component. In the following an example is provided using the zeroth order and first order periodic components.

In this example embodiment, the pitch control signal is determined for the 0P (zeroth order) and 1P (first order) components based on a pitch signal stored for the previous rotor revolution. The 0P component is of interest to account for any (quasi-)static offsets that may be imposed. The 1P component may account for any wind field-based cyclic pitch action being present.

In this situation, for each azimuth step k, Fourier coefficients $\Theta_0$ a and $\Theta_1$ are computed:

$$\Theta_0(k) = \sum_{n=0}^{N-1} \theta_{k-N+n}$$

$$\Theta_1(k) = \sum_{n=0}^{N-1} \theta_{k-N+n} + e^{-\frac{j2\pi n}{N}}$$

Upon shutdown, the pitch sequence $\hat{\theta}_n$, with $\hat{\theta}_n$ are synthesised for the n'th pitch sample after the shutdown, leading to:

$$\hat{\theta}_n = \frac{1}{N}\left(\Theta_0 e^{\frac{j2\pi 0 n}{N}} + \Theta_1 e^{\frac{j2\pi n}{N}} + \Theta_1^* e^{\frac{j2\pi(N-1)n}{N}}\right)$$

which result in:

$$\hat{\theta}_n = \frac{1}{N}\left(\Theta_0 e^{\frac{j2\pi 0 n}{N}} + \Theta_1 e^{\frac{j2\pi n}{N}} + \Theta_1^* e^{-\frac{j2\pi n}{N}}\right) = \frac{1}{N}\left(\Theta_0 + 2n(\theta_1)\cos\left(\frac{2\pi n}{N}\right) - 2\Im(\Theta_1)\sin\left(\frac{2\pi n}{N}\right)\right)$$

Where $\Re(x)$ and $\Im(x)$ denotes the real and imaginary parts, respectively, of the complex number x.

In a specific implementation, this formulation implies that the coefficients $\Theta_0$ and $\Theta_1$ are updated at each azimuth step until shutdown, where the update is discontinued. During shutdown, the synthesized pitch $\hat{\theta}_n$ at time step n is computed as stated above, using $\Theta_0$ and $\Theta_1$ alongside the cosine and sine terms. The trigonometric terms can be pre-computed and resolved using simple table look-up, if needed.

One important advantage of embodiments of the present invention is that the pitch control signal can be based on the stored pitch signal and applied during shutdown without further input. In an embodiment this can be utilized to generate the pitch control signal without taking sensor input into account. For example, in embodiments it is possible to generate the pitch control signal without taking blade load sensor signals or other load sensor signals into account. This is advantageous since the system components used to handle a shutdown may be system components operating in the safety domain, and normally load sensors are not placed in the safety domain.

As explained above, the pitch adjustable rotor blades are controlled towards a feathering position using a pitch control signal 22 containing the at least one periodic component. The actual pitch signal 28 sent to, or used by, the pitch actuators need not be identical to the pitch control signal 22, and in many cases will not be so. The actual pitch angles, or pitch trajectory used to stop the rotation of the rotor may comprise further signals which are combined with the pitch control signal to move the pitch adjustable rotor blades towards a feathering position. This combination is illustrated on FIG. 2 by the controller element 27 which represent further controller elements used to determine further pitch signals used for stopping the rotor.

In this manner it may be ensured that any asymmetric loading to the rotor is mitigated during the stopping process, but that any further control of the stopping process is also accounted for. Such further control may include a control of the mean pitch rate.

Figure 3:
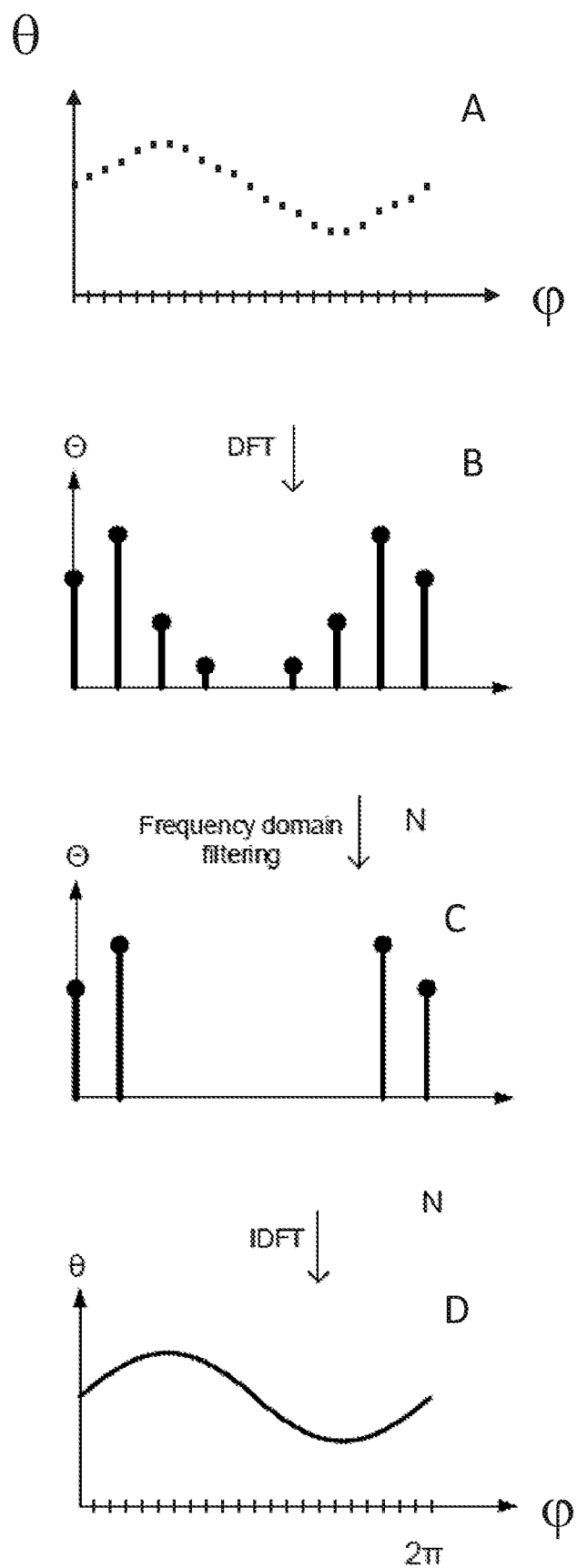
FIG. 3 illustrates aspects relating to the determination of periodic components of the stored signal.

FIG. 3 illustrates further elements of the embodiments of the present invention.

FIG. 3A shows a schematic stored pitch angle signal, θ for equally spaced azimuth angles from 0 to 2π. The figure schematically illustrates pitch variations applied in the pitching prior to stopping the rotor.

FIG. 3B illustrates the determination of periodic components of the stored signal done by taking the discrete Fourier transform of the pitch angle signal of FIG. 3A, with respect to azimuth angle. The resulting spectrum is shown in FIG. 3C. It can be seen that the average value (0P) and the first harmonic (1P) are the predominant components. In FIG. 3C only the 0P component and the 1P component are selected. This corresponds to a frequency-domain filtering.

In FIG. 3D the pitch control signal containing the at least one periodic component is obtained by applying the inverse discrete Fourier transform of the signal of FIG. 3C. This yields the pitch as function of azimuth as shown.

Figure 4:
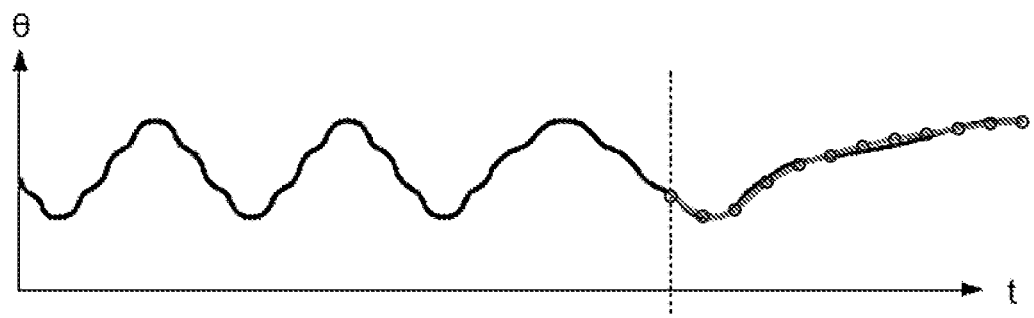
FIG. 4 illustrates pitch signals obtained using embodiments of the present invention.

FIG. 4 illustrates the difference between basing the pitch signal on FIG. 3B (solid line) and FIG. 3C (marked line). As can be seen the synthesized signal based on only 0P and 1P components resembles the ideal signal, but without higher frequency components.

The control system handling the control of the pitch adjustable rotor blades towards a feathering position may be based on generic or standard industrial computing equipment, however it may advantageously alternatively be based on safety computing equipment; that is, on a safety controller. While the safety controller in an embodiment may be a safety certified controller, it need not be safety certified but rather a controller based on rigorously tested software and hardware fulfilling the same or similar requirements as those needed for a certification. Such type of controller may also be referred to as a safety certifiable controller. Typically, the safety-related part of the control system may be constructed according to the principles given in recognized standards for functional safety, Such standards encompass e.g. ISO 13849, IEC 61508, and IEC 62061. Besides from fulfilling specific, quantitative requirements to reliability and diagnostic coverage, systems constructed according to these standards are assumed to be free of systematic failures such as software defects. The control system may thus be split into a normal control domain which perform the calculating tasks using standard computing equipment, and a safety control domain which performs the calculating tasks using safety-related computing equipment.

In an advantageous embodiment, the rotor stop signal is generated by a safety controller. In this manner it can be ensured that high reliability of the safety controller is used to control the stopping of the rotor.

In an advantageous embodiment, the generation of the rotor stop signal is triggered by a safety controller upon occurrence of a fault signal. The fault signal may originate from sensors also placed in the safe domain, but need not be.

Figure 5:
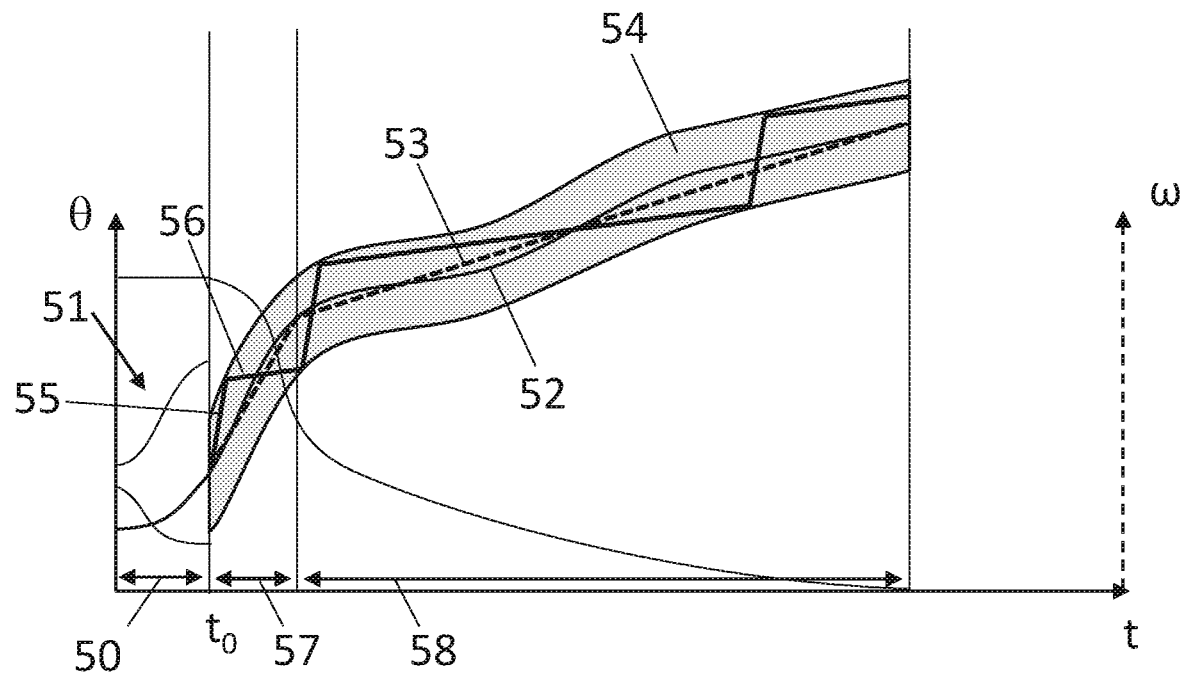
FIG. 5 illustrates an embodiment where safety controller is implemented as a stop controller arranged to pitch the blades individually at a number of pre-set approximately constant pitch rates.

FIG. 5 illustrates an embodiment where a safety controller is implemented as a stop controller being arranged to pitch the blades individually at a number of pre-set approximately constant pitch rates including a first pitch rate and a second pitch rate lower than the first pitch rate, and wherein the safety controller is further arranged to:

access desired pitch angles 52 of the stopping process;

add an envelope band 54 to the desired pitch angles by adding a positive value and a negative value thereby defining an upper band value and a lower band value; and wherein the safety controller is arranged to:

move the pitch adjustable rotor blade at a selected pitch rate among the number of pre-set pitch rates until the pitch angle signal is outside a pitch angle value defined by the envelope band, if the pitch angle signal is larger than the upper band value, change the selected pitch rate to a lower pitch rate among the number of pre-set pitch rates, and if the pitch angle signal is smaller than the lower band value, change the selected pitch rate to a higher pitch rate among the number of pre-set pitch rates.

FIG. 5 illustrates a schematic embodiment of a stopping process where a rotor stop signal is received at t0. In the period 50 prior to receipt of the rotor stop signal, stored pitch angle signals are generated by storing pitch angle signals 51 for each of the pitch adjustable rotor blades for at least a fraction of a rotor revolution. As explained above, either prior to receipt of the rotor stop signal, or upon receipt of the rotor stop signal, one or more periodic components of the stored signal is generated and used to control the rotor blades towards a feathering position. In the figure three varying pitch trajectories 51 are illustrated in the period before to. In the periods following $t_0$ 57, 58, only a single pitch trajectory and a single envelope band is shown. This is for illustrative reasons, as further envelope bands may be present, since either a shared envelope or individual envelopes for each blade may be envisioned.

In the stopping process, desired pitch angles (a desired pitch trajectory) of the stopping process is accessed. The desired pitch angles are defined by a superposition of a pitch ramp and the pitch control signal containing the at least one periodic component, resulting in a pitch control signal 52 overlaying the pitch ramp 53. In the example of FIG. 5, the pitch ramp 53 comprises a first stage 57 with a high mean pitch rate and a second stage 58 with a lower mean pitch rate.

The figure further shows the rotor speed, showing that the turbine is operated at rated speed until the rotor stop signal is received at $t_0$, after which the rotor speed decreases towards zero. The rotor speed merely indicates the general behaviour of the rotor speed and not the exact rotor speed that would match the illustrated pitch angles.

The stop controller comprises a controller unit implemented to access desired pitch angles 52 of the stopping process and add an envelope band 54 to the desired pitch angles by adding a positive value and a negative value thereby defining an upper band value and a lower band value. With the band defined, the stop controller is arranged to:

move the pitch adjustable rotor blade at a selected pitch rate 55, 56 among the number of pre-set pitch rates until the pitch angle signal is outside a pitch angle value defined by the envelope band, if the pitch angle signal is larger than the upper band value, change the selected pitch rate to a lower pitch rate among the number of pre-set pitch rates, and if the pitch angle signal is smaller than the lower band value, change the selected pitch rate to a higher pitch rate among the number of pre-set pitch rates.

In the example of FIG. 5, the stop controller is arranged to pitch the blades at two pre-set pitch rates, a first high pitch rate 55 and a second low pitch rate 56. The pitch rates may be set in accordance with a given design. The first pitch rate may be between 3 and 15°/s, whereas the second lower pitch rate may be between 0 and 5°/s.

Upon receipt of the rotor stop signal at t0, the pitch blade is moved at the high pitch rate 55. While moving the blades towards feathering, the pitch angle signal is compared to the envelope band and once it its detected that pitch angle signal is larger than the upper hand value, the selected pitch rate is changed to the low pitch rate 56. The comparison is maintained during the stopping process, and once the pitch angle signal is detected to be smaller than the lower band value, the low pitch rate 56 is changed to the high pitch rate 55, This logic is kept running during the stopping process.

In the stopping process, the pitch ramp can be used to control the rotor speed reduction and thrust issues, whereas the individual pitch angle setting can be used to mitigate asymmetric loads on the rotor during the stopping process and tower vibrations in accordance with the embodiments of the present invention.

FIG. 5 thus illustrate an embodiment where the stop controller takes as input a shutdown pitch reference signal and determine a discretized pitch actuation signal such that the resulting pitch trajectory approximates the shutdown pitch reference signal using the number of pre-set, approximately constant pitch rates.

Example embodiments of the invention have been described for the purposes of illustration only, and not to limit the scope of the invention as defined in the accompanying claims.

The invention claimed is:

1. A method for controlling a wind turbine, the wind turbine comprises a rotor with one or more pitch adjustable rotor blades, wherein the method comprises:
   storing pitch angles for each of the pitch adjustable rotor blades, the pitch angles being sequentially sampled continuously across at least a fraction of a revolution of the rotor for each rotor blade;
   generating a stored pitch angle signal for the one or more pitch adjustable rotor blades from the stored pitch angles;
   determining at least one periodic component of the stored pitch angle signal;
   generating a rotor stop signal to stop the rotor; and
   in response to the generating a rotor stop signal, controlling the pitch adjustable rotor blades towards a feathering position using a pitch control signal containing the at least one periodic component.

2. The method of claim 1, wherein the stored pitch angle signal is the pitch angles as a function of rotor azimuth angle, being the angle of the blade in the rotor plane.

3. The method of claim 1, wherein the stored pitch angles are either stored pitch angle references or stored pitch angular positions.

4. The method of claim 1, wherein the fraction of the rotor revolution is between 0.5 and 1.5 revolution.

5. The method of claim 1, wherein the at least one periodic component is determined based on a Fourier transform.

6. The method of claim 1, wherein a selected number of periodic components are determined, and wherein the selected number includes at least the zero order and first order periodic component.

7. The method of claim 1, wherein the pitch control signal is generated without taking load sensor input into account.

8. The method of claim 1, wherein a pitch actuation signal applied by pitch actuators to move the one or more pitch adjustable rotor blades towards a feathering position is a combination of the pitch control signal and further pitch signals.

9. The method of claim 1, wherein the control of the pitch adjustable rotor blades towards a feathering position is done by a safety controller.

10. The method of claim 9, wherein the safety controller executes a stopping process arranged to pitch the one or more blades individually at a number of pre-set constant pitch rates including a first pitch rate and a second pitch rate lower than the first pitch rate, and wherein the safety controller is further arranged to:
    access desired pitch angles of the stopping process;
    add an envelope band to the desired pitch angles by adding a positive value and a negative value thereby defining an upper band value and a lower band value; and
    wherein a stop controller is arranged to:
        move each pitch adjustable rotor blade at a selected pitch rate among the number of pre-set pitch rates until the pitch angle signal is outside a pitch angle value defined by the envelope band;
        if the stored pitch angle signal is larger than the upper band value, change the selected pitch rate to a lower pitch rate among the number of pre-set pitch rates; and
        if the stored pitch angle signal is smaller than the lower band value, change the selected pitch rate to a higher pitch rate among the number of pre-set pitch rates.

11. The method of claim 1, wherein the rotor stop signal is generated by a safety controller.

12. The method of claim 1, wherein the generation of the rotor stop signal is triggered by a safety controller upon occurrence of a fault signal.

13. A wind turbine comprising a control system and a rotor with one or more pitch adjustable rotor blades, the control system comprising one or more controller units arranged to:
    store pitch angles for each of the pitch adjustable rotor blades, the pitch angles being sequentially sampled continuously across at least a fraction of a revolution of the rotor for each rotor blade;
    generate a stored pitch angle signal for the one or more pitch adjustable rotor blades from the stored pitch angles;
    determine at least one periodic component of the stored pitch angle signal;
    generate a rotor stop signal to stop the rotor; and in response to generating the rotor stop signal, control the pitch adjustable rotor blades towards a feathering position using a pitch control signal containing the at least one periodic component.

14. The wind turbine of claim 13, wherein the stored pitch angle signal is the pitch angles as a function of rotor azimuth angle, being the angle of the blade in the rotor plane.

15. A computer program product comprising a non-transitory computer readable medium having software code adapted to control a wind turbine, the computer program product being adapted to perform an operation for controlling the wind turbine, the wind turbine comprising a rotor with one or more pitch adjustable rotor blades, the operation comprising:

storing pitch angles for each of the pitch adjustable rotor blades, the pitch angles being sequentially sampled continuously across at least a fraction of a revolution of the rotor for each rotor blade;

generating a stored pitch angle signal for the one or more pitch adjustable rotor blades from the stored pitch angles;

determining at least one periodic component of the stored pitch angle signal;

generating a rotor stop signal to stop the rotor; and in response to the generating a rotor stop signal, controlling the pitch adjustable rotor blades towards a feathering position using a pitch control signal containing the at least one periodic component.

16. The computer program product of claim 15, wherein the stored pitch angle signal is the pitch angles as a function of rotor azimuth angle, being the angle of the blade in the rotor plane.

17. The computer program product of claim 15, wherein the stored pitch angles are either stored pitch angle references or stored pitch angular positions.

18. The computer program product of claim 15, wherein the fraction of the rotor revolution is between 0.5 and 1.5 revolution.

* * * * *